Patented May 30, 1944

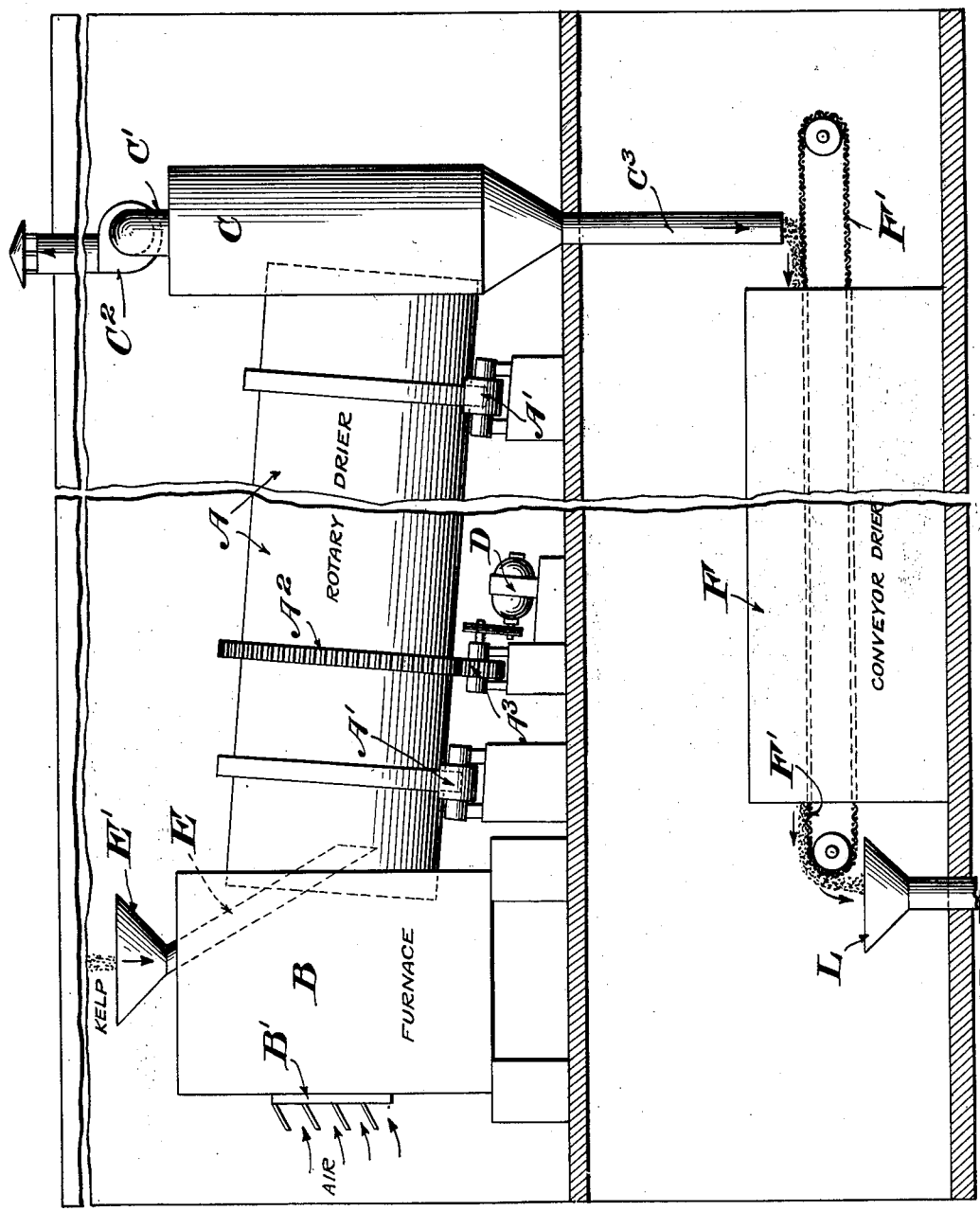

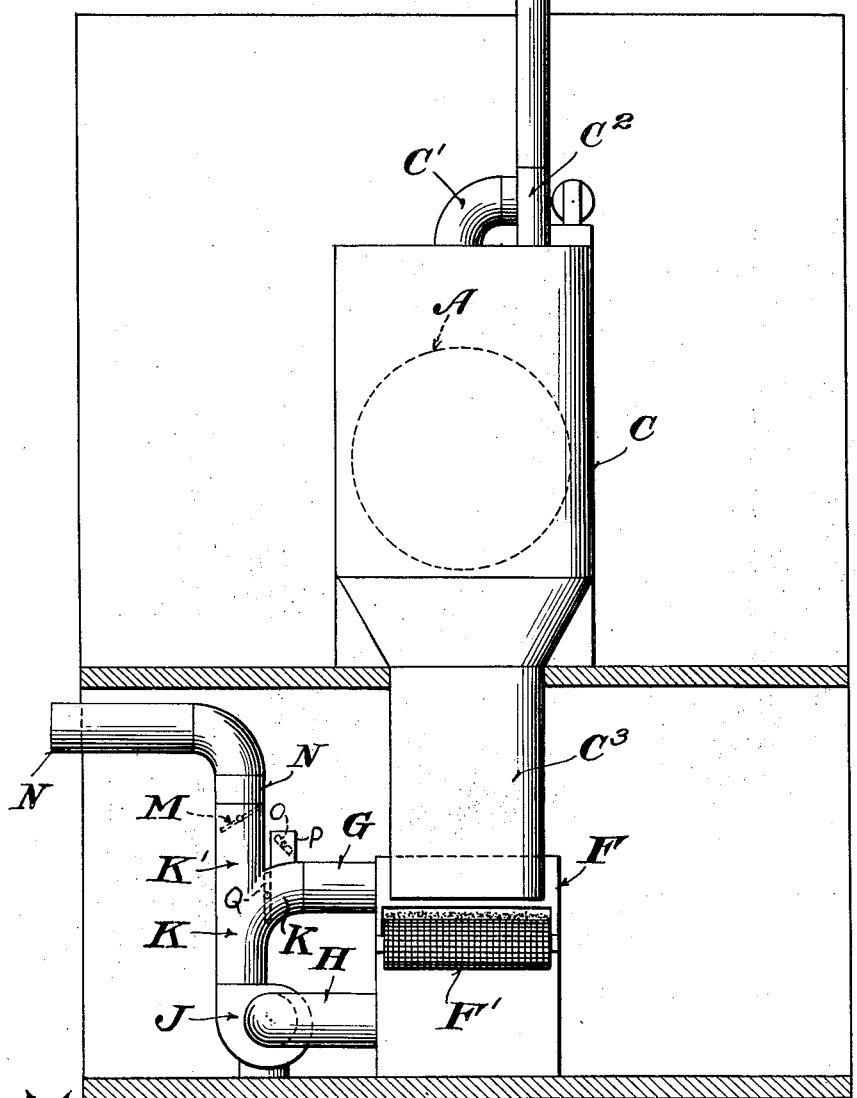
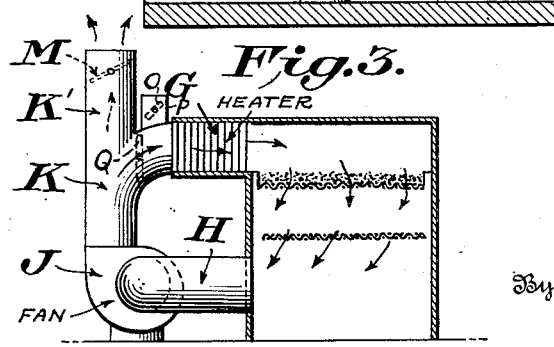

2,350,209

UNITED STATES PATENT OFFICE 2,350,209

METHOD FOR DRYING KELP

Donald E. Clark, Leland D. Pratt and Spencer A. Coleman, San Diego, and Harland C. Green, El Cajon, Calif., assignors to Kelco Company, Los Angeles, Calif., a corporation of Delaware Application September 12, 1940, Serial No. 356,550

5 Claims. (Cl. 34—17)

This invention is a novel method for drying kelp, and the principal object thereof is to provide a two-stage drying method in which the chopped kelp is initially partially dried in a rotary drier and the partly dried kelp then discharged into a conveyor drier, said driers being subjected to such temperatures and rates of air flow therethrough that while the chopped kelp which is fed into the rotary drier will be in a very mushy condition, the kelp when completing its passage through the rotary drier will be in a much drier state, so that when the kelp is transferred onto the conveyor-drier said air currents may pass readily through the kelp piled to the depth of several inches on the conveyor belt. The two driers thus form an ideal combination apparatus, the use of which results in a product which can be manufactured at such low cost that it may be used in animal feeds, said product containing a high amount of carotene, vitamin G (riboflavin), and minerals; also a product having a good color, free from char, and a product retaining its colloidal ability to absorb water.

Heretofore kelp spread out in a field or on a beach has been dried by exposure to the sun's rays. Such natural method however, while practical for some purposes, does not conserve all of the constituents found in kelp, such as the carotene content, and the vitamin G constituent (riboflavin), both of which are known to deteriorate in sunlight.

One artificial method of drying kelp is described in U. S. Letters Patent #1,875,352, issued September 6, 1932, to Philip R. Park, which describes the rapid cooking of chopped kelp at temperatures of 800°–900° F. to produce a cooked product in which the colloidal properties of the kelp are destroyed.

Another artificial method of drying kelp is described in U. S. Letters Patent #1,513,298 issued October 28, 1924, to John W. Turrentine, which discloses the rapid drying of kelp.

Both of these processes employ rapid drying of the kelp and neither discloses the unique combination of a rotary drier and a conveyor drier which enables us to produce by a commercially feasible slow drying process a dried kelp retaining its original colloidal characteristics.

We will explain the invention with reference to the accompanying drawings which illustrate one practical embodiment thereof to enable others familiar with the art to adopt and use the same; and will summarize in the claims the essential features of the invention for which protection is desired.

In said drawings:

Fig. 1 is a side elevation showing conventionally an apparatus for drying kelp according to our method;

Fig. 2 is an end elevation thereof; and

Fig. 3 is a transverse section through the conveyor drier.

The apparatus shown comprises an inclined rotary cylindrical drier A having its upper end entering a furnace B and its lower end entering a casing C, said drier having rings journaled in bearings A' and having a ring gear A2 meshing with a driving pinion A3 driven by a motor or the like conventionally shown at D. However, drier A may be rotated in any other desired manner. Extending downwardly through the top of furnace B and into the upper end of drier A is an inlet pipe E preferably provided with a hopper E' through which the wet ground or chopped kelp flows or may be forced into the upper end of rotary drier A. Furnace B is heated by any suitable means, such as by oil, gas, coal, or the like; and atmospheric air enters the furnace B preferably through a louvered inlet B' and the air is heated therein to 1200°–1800° F. and is then drawn or blown through rotary drier A and into casing C from which the moisture laden air is discharged to the atmosphere through vent pipe C' in the top of casing C having an exhaust fan C2 therein creating artificial draft.

According to our method the freshly harvested kelp (Macrocystis pyrifera) is first ground or chopped so that most of it will pass through a screen having about two meshes per square inch. The wet ground or chopped kelp entering the rotary drier A through feed pipe E has a solids content of about 13%. As drier A is rotated, the kelp gravitates therethrough, same remaining in the drier for approximately twenty minutes during which time the heated air in contact with the wet kelp will have raised the temperature thereof to about 120°–160° F.; the air issuing from the lower end of drier A having a temperature of 250°–350° F., and the still moist kelp issuing from the lower end of drier A having a solids content of 40%–65%. In other words, 0.75 to 0.9 of the water is removed in the rotary drier.

Thus the kelp discharged into casing C is still wet, although the major portion of the moisture has been carried off with the air discharged through vent C'; and we purposely do not remove all the moisture from the kelp in rotary drier A; and at no time while in the drier A is the kelp heated above the ebullition point of the plant juices even though the heated air or gases entering drier A may have a temperature of 1200°–1800° F., and the air discharging from drier A may have a temperature of 250°–350° F. While the kelp entering the upper end of rotary drier A will normally be very mushy, before same completes its passage through said drier, same will have reached a much drier but still moist state in which condition air may readily penetrate therethrough.

The lower end of casing C is contracted to form a delivery spout C3 discharging onto the reticulated endless belt F'' of a conveyor drier F, said belt F'' being preferably of wire mesh so that air may readily pass therethrough. The partially dried material from rotary drier A is thus transferred substantially immediately to the conveyor drier F, the kelp being spread onto belt F'' thereof in a layer of 2-3 inches thickness by any suitable means.

Extending along the side of conveyor drier F are one or more heaters G disposed adjacent the top thereof and discharging above belt F''. Ducts H take in air below the belt F adjacent the bottom of dried F and direct same into the inlets of air circulating fans J, the outlets of which are connected by ducts K leading directly into the heaters G whereby heated air may be caused to circulate down through the belt F'' and the kelp thereon as the belt passes through the drier F to outlet L. The temperature of the heated air in the conveyor drier F is about 200°-260° F., and the kelp on belt F'' is heated thereby during its passage of about 30 minutes duration to a temperature of 120°-210° F. The volume of heated air passing through each heater G may be controlled preferably by means of a damper M in a by-pass K' or duct K leading into a common header N discharging into the atmosphere. When dampers M are closed, all the air from fans J will be directed through the heaters G, and when dampers M are open substantially all the air from fans J will pass directly into header N. Make-up air, to replace that exhausted from the conveyor dryer F into the headers N when dampers M are open, is drawn in through air inlets P in ducts K disposed in advance of the heaters G, said inlets P having dampers O therein controlling the volume of make-up air admitted. Between the air inlets P and the by-passes K' of ducts K are dampers Q serving to control the proportion of air delivered by fans J to the heaters G and to the headers N. The make-up air admitted through inlets P to the ducts K may thus be directed through heaters G, and down through the material to be dried on conveyor F'', through fans J, and then part of the air may be directed past dampers Q again into the heaters G and the balance directed past dampers M into the atmosphere. One may control the amount of air through cycles by adjustment of dampers M, Q, and O. The conveyor drier F is under a slight vacuum and sucks in air around the dampers O. The heated air circulating downwardly through belt F'' and through the kelp thereon removes the desired amount of moisture remaining in the kelp delivered to the conveyor drier F, so that the kelp discharged from the drier F at outlet L will contain only 5-15% of moisture.

The dried product at outlet L may then be passed through a cyclone or other fan and through a shaker or other screen, and if desired the product may be milled and placed in sacks for marketing, as cattle and/or chicken feed, or for other uses. High amounts of carotene content of the kelp as well as vitamin G (riboflavin) remain in our product, and our product has a good color and is free from char. The product also retains its colloidal ability to absorb water, and is rich in trace and essential minerals.

The use of the two-stage method and apparatus involving a rotary drier A and a conveyor drier F through which the wet chopped kelp is successively passed as above described, greatly lessens the cost of fuel for our drying process, and results in a better product than could be obtained when using only a single drier for in our process the alginate is always kept moist while in the rotary drier and therefore avoids burning or excessive drying. We have found that when it is attempted to dry kelp completely in a single conveyor drier such as F, the kelp is in such a mushy state on the belt that air cannot pass therethrough, and the product therefore does not dry uniformly.

This difficulty could be overcome by having a conveyor drier about several times larger than the present drier, but such is not commercially feasible.

We claim:

1. A method for drying kelp, comprising the steps of passing heated air having an initial temperature of 1200°-1800° F. in contact with a continuous stream of wet chopped kelp to raise the temperature of the kelp to at least 120° F. and not over 160° F. and reduce the moisture content thereof to 60-35%; forming the partly dried kelp into a continuous foraminated layer; and then circulating heated air at a temperature of 200°-260° F. through said layer while maintaining the kelp at a temperature range of 120°-210° F. until the moisture content thereof is reduced to 15-5%.

2. The method of drying freshly harvested chopped kelp having a high moisture content, comprising the steps of repeatedly dropping the kelp through a stream of hot gases to raise the temperature of the kelp to at least 120° F. and not over 160° F. whereby the moisture content of the kelp will be reduced to substantially 35-60% so that air will pass therethrough; then spreading the partially dried kelp as a thin layer on a foraminous support; and then blowing heated air through the layer to maintain the temperature of the kelp at 120-210° F. until its moisture content is substantially entirely removed.

3. In a method as set forth in claim 2, the spreading step being performed immediately after the first step, whereby the last step will proceed before the temperature of the kelp is materially lowered.

4. The method of drying freshly harvested chopped kelp having an initial moisture content of about 87%, comprising the steps of repeatedly dropping the kelp through a stream of hot gases to raise the temperature of the kelp to at least 120° F. and not over 160° F. whereby the moisture content of the kelp will be reduced to 60-35% to permit air to pass therethrough; then spreading the partially dried kelp as a thin layer on a foraminous support; and then blowing heated air through the layer to maintain the temperature of the kelp at 120°-210° F. until its moisture content is reduced to 15-5%.

5. In a method as set forth in claim 4, the spreading step being performed immediately after the first step, whereby the last step will proceed before the temperature of the kelp is materially lowered.

DONALD E. CLARK.
LELAND D. PRATT.
SPENCER A. COLEMAN.
HARLAND C. GREEN.